United States Patent
Hofmann et al.

(10) Patent No.: US 8,690,256 B2
(45) Date of Patent: Apr. 8, 2014

(54) SEAT CUSHION WITH FOAMED-IN FASTENING ELEMENT

(75) Inventors: Manfred Hofmann, Hettstadt (DE); Günter Meckelmann, Kitzingen (DE)

(73) Assignee: F. S. Fehrer Automotive GmbH (DE)

( * ) Notice: Subject to any disclaimer, the term of this patent is extended or adjusted under 35 U.S.C. 154(b) by 480 days.

(21) Appl. No.: 12/877,537

(22) Filed: Sep. 8, 2010

(65) Prior Publication Data

US 2011/0080033 A1  Apr. 7, 2011

(30) Foreign Application Priority Data

| Oct. 1, 2009 | (DE) | 10 2009 043 673 |
| Oct. 28, 2009 | (DE) | 10 2009 051 059 |
| May 14, 2010 | (DE) | 10 2010 020 506 |

(51) Int. Cl.
 *A47C 7/02* (2006.01)
(52) U.S. Cl.
 USPC ..................... 297/452.6; 297/218.2
(58) Field of Classification Search
 USPC ............. 297/452.6, 452.59, 218.2, 452.58; 5/406, 407; 24/111
 See application file for complete search history.

(56) References Cited

U.S. PATENT DOCUMENTS

| 310,102 | A | * | 12/1884 | Walker | 24/111 |
| 400,296 | A | | 3/1889 | Brott | |
| 3,630,572 | A | * | 12/1971 | Homier | 297/452.6 |
| 3,736,022 | A | | 5/1973 | Radke | |
| 3,794,378 | A | * | 2/1974 | Haslam et al. | 297/452.6 |
| 3,961,823 | A | * | 6/1976 | Caudill, Jr. | 297/452.6 |
| 5,214,811 | A | * | 6/1993 | Priem | 5/655.6 |
| 5,605,373 | A | * | 2/1997 | Wildern et al. | 297/218.4 |

FOREIGN PATENT DOCUMENTS

| DE | 2236742 | 7/1972 |
| DE | 23 58 992 | 5/1975 |
| DE | 41 18 396 C1 | 9/1992 |
| DE | 10025734 A1 | 12/2001 |
| DE | 101 20 621 B4 | 11/2002 |
| DE | 102007008018 A1 | 8/2008 |
| EP | 1 122 124 A1 | 8/2001 |
| FR | 2 777 879 A1 | 10/1999 |
| WO | 2007/008662 A2 | 1/2007 |
| WO | 2009/065456 A1 | 5/2009 |

* cited by examiner

*Primary Examiner* — David E Allred
(74) *Attorney, Agent, or Firm* — Quarles & Brady LLP

(57) ABSTRACT

A seat cushion having a plurality of foamed-in fastening elements in particular for utilization in vehicle seats. The fastening element has a plate-shaped retainer element foamed into the foam body of the seat cushion, and wherein the fastening element has at least one counter-retainer that is not covered by the foam body of the seat cushion, and wherein a stitching wire fastened at the cushion cover can be connected to the counter-retainer in a load-transmitting manner, wherein the counter-retainer is implemented in the type of a fastening web, the two ends thereof being connected to the plate-shaped retainer element.

15 Claims, 3 Drawing Sheets

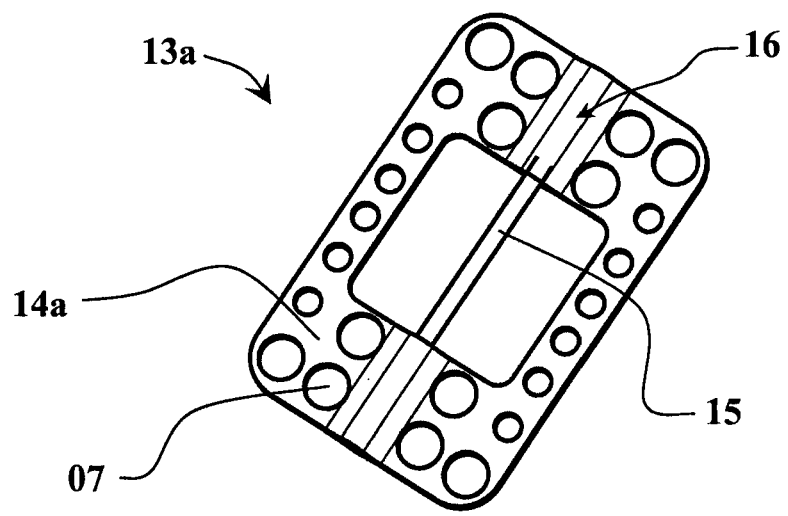
Fig. 5
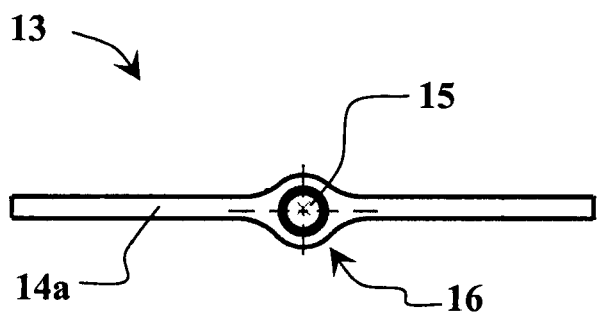
Fig. 6
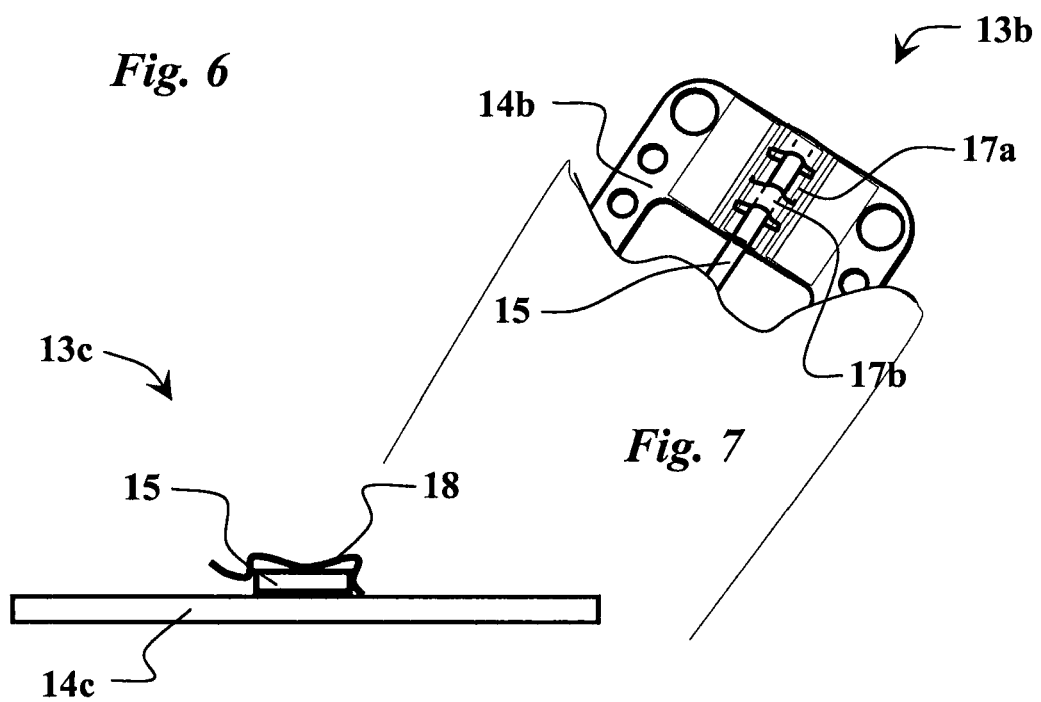
Fig. 7
Fig. 8

SEAT CUSHION WITH FOAMED-IN FASTENING ELEMENT

CROSS REFERENCE TO RELATED APPLICATION

This application claims priority to German Patent Application No. 10 2009 043 673.1, filed on Oct. 1, 2009, German Patent Application No. 10 2009 051 059.1, filed on Oct. 28, 2009, and German Patent Application No. 10 2010 020 506.0, filed on May 14, 2010, all of which are fully incorporated herein by reference.

STATEMENT REGARDING FEDERALLY SPONSORED RESEARCH OR DEVELOPMENT

Not applicable.

FIELD OF THE INVENTION

The present invention relates to a seat cushion having a plurality of foamed-in fastening elements. Here, the fastening element is composed of a plate-shaped stitching element.

BACKGROUND OF THE INVENTION

From the state of the art, a large variety of different retainer elements disposed in seat cushions are known. The retainer elements disposed in the seat cushions serve the purpose of fastening a cushion cover at a seat cushion. To this end, fastening devices implemented in the form of stitching wires are disposed at the cushion cover. These stitching wires are intended to be connected to the fastening element disposed in the seat cushion. During assembly of the cushion cover, the stitching wires are fastened at the fastening elements in the cushion cover either directly or else with the aid of additional connecting elements.

In a simple manner, in the method known from the state of the art, fastening wires are foamed into the seat cushion. This fastening wire is individually formed so as to precisely correspond to the contour of the respective seat and is foamed into the seat cushion in meandering lines. A recess is provided at the fastening positions, in order to be able to correspondingly fasten the stitching wire at the fastening element in the foam cushion.

It is a drawback of this embodiment that the wire needs to be individually bent for each seat shape. Moreover, it is necessary to insert the complex wire geometry into the foaming tool. This aspect, however, involves increased complexity of the production process, since the unstable wire structure needs to be inserted in a secure and positionally accurate manner.

In order to solve this problem, document DE 10 2007 008 018 A1 exemplarily describes a fastening element configured as a plate-shaped component. Fastening hooks are arranged in the center of this component. In this regard, it is possible to hook the stitching wire of the cushion cover into the fastening hooks. Thanks to this solution alone a decisive advantage can be attained, since a standard component can be utilized as fastening element for a large variety of different seat shapes.

However, in the implementation of solutions suggested in the state of the art, comparable to the above-referenced document, two significant drawbacks are encountered. On the one hand, insertion of the tool is not unproblematic. Due to the shape of the clip geometry, the fastening elements can only be effectively made of plastics. When inserting the plurality of clipping elements, complex robotic operations are required, so as to be able to insert the plurality of fastening elements into the foam body in a positionally accurate manner. Hence, automation expenditure during the production process of the seat cushion is unnecessarily increased. During utilization of the seat cushion for producing the seat, another drawback is encountered. As a result of the large tolerances in a cushion cover, it is repeatedly necessary to detach the cushion cover from the seat cushion. This gives rise to the aspect that, in case of a clipped-in solution, the clip will frequently break off from the retainer element. In this instance, the entire seat cushion is rendered useless for further utilization, since a means for fastening the cushion cover is no longer available.

SUMMARY OF THE INVENTION

Thus, it is an object of the present invention to suggest a fastening element for a seat cushion, which, on the one hand, can be produced inexpensively, is simple and secure in terms of utilization in the seat cushion and on the other hand enables simple and secure assembly of the cushion cover, likewise in case of repair works.

This object is attained in a seat cushion having foamed-in fastening elements and in an inventive fastening element, such as described and claimed herein.

An inventive seat cushion, in particular for utilization in vehicle seats, includes a plurality of foamed-in fastening elements. The fastening element in a known manner has an essentially flat retainer element that is almost completely or else completely foamed into the foam body of the seat cushion. In addition, the fastening element has a counter-retainer that is not covered by the foam cushion. A stitching wire fastened at the cushion element can thus be connected to the counter-retainer in a load-transmitting manner.

It is a characteristic feature of the invention that the counter-retainer is implemented in the type of a fastening web, the two ends thereof being connected to the plate-shaped retainer element.

Thanks to the inventive design of the fastening elements, the advantages of both methods known from the state of the art are combined. The fastening elements can be flexibly positioned, wherein for this purpose, common parts are utilized. Hence, the hitherto necessary bending of a wire and the ponderous handling thereof can be dispensed with. At the same time, however, as is the case in a fastening element in the form of a wire, it is possible to remove the cushion cover jointly with the stitching wire from the seat cushion several times and to reattach the same thereto again. The risk that a clip may break off is thus completely eliminated.

Advantageously the fastening element is integrally made from one sheet metal. For this purpose, it is advantageously punched out therefrom.

Through selection of a sheet metal thickness in the utilization of a sheet metal, preferably at a maximum of 1.5 mm, but in particular smaller than 1 mm, it is possible to produce the fastening element inexpensively, in particular through the punching process.

It is equally possible to employ plastics as an alternative material. Hence, it is possible to produce the fastening element inexpensively using an injection-molding process.

Increased stability can be attained at low production costs if the fastening element is composed of a metal web and a plastic plate serving as a retainer element. By means of this measure, it is possible to decrease the anyway low weight still further. Moreover, foamability of the fastening element into the foam body is enhanced. In particular, potentially sharp metal cutting edges do not occur, which may very easily cause damage to and slits in the foam body.

In this case, the fastening web is formed by the metal web and the retainer element is formed by the plastic plate. In this context, the metal web is connected to the plastic plate, in particular in a fixed fashion. For this purpose, various options are available.

The injection-molding process is advantageous for the production of the fastening element, since it enables the insertion of the metal web already in the tool and injection-molding around the ends thereof. This measure does not entail complete enclosure of the ends of the metal webs, since keeping the frontal sides or other smaller regions free from plastics does not produce a detrimental effect.

The same result for the fastening element can also be attained if a centrally arranged longitudinal bore, that is not required to have a round shape and into which the metal web starting from its frontal end is inserted or press-fitted, is provided in the injection-molded plastic plate.

In a simple embodiment, the metal web with both of its ends can be connected to the plastic plate with the aid of fixtures provided thereon. In this context, the metal web is also fastened to the plastic plate using a clamping force. The metal web can be arranged both on one side of the plastic plate, for instance with a C-shaped clip serving as a fixture at the plastic plate, and on both sides. The both-sided fastening using for instance loops serving as fixtures provides the advantage that the side of the fastening web that faces the seat cover is not required to be taken into account. Here, a clamping force solution can also be utilized for connecting the metal web to the plastic plate, for instance through alternating webs.

In the two-piece embodiment it is advantageous, in particular during production of the fastening element by means of an assembly process using plastic plate and metal web, if the metal web is composed of a wire section. This wire section for this purpose preferably has a straight shape, thereby significantly simplifying both production and processing of the wire section. The wire section as a rule has a round cross-section. This aspect, however, is irrelevant for the problem to be solved, so that a cross-section deviating from the cross-section specified here, for instance with a square shape, can equally be utilized.

In order to reduce the weight of the fastening element to a minimum and at the same time optimize hold in the foam body, it is advantageous to provide the fastening element with recesses in the region of the plate-shaped retainer element.

The production of the seat cushion, in particular utilization of the fastening elements in the production tool, can be significantly enhanced if the sheet metal or the metal web can be positioned with the aid of a magnetic retainer.

If the selection of a very small material thickness results in insufficient rigidity of the retainer element or the fastening web, it is advantageously possible to reinforce the fastening element with the aid of profile patterns.

In order to simplify assembly of the cushion cover at the stitching wire by means of the connecting element, it is possible to cause the fastening web to protrude beyond the plate-shaped retainer element with the aid of a bent shape.

In the simplest form, however, the fastening web has a straight shape extending in the plane of the plate-shaped retainer element.

Provision is made for the aspect that the fastening element is utilized as a common part for a large variety of different positions. Moreover, it is advantageous for the utilization of the fastening element if it can be used without further control in any optional position, respectively be turned by 180°. It is accordingly necessary to advantageously arrange the fastening web substantially symmetrically in the center of the fastening element. Provided that a multiple, rotatory utilization turned by 180° is unrestrictedly possible it is irrelevant if the outer contour of the fastening element or the recesses in the retainer element are symmetrical with respect to two planes being arranged vertically to one another and being arranged vertically to the plane of the retainer element.

The fastening element for foaming into a seat cushion, in particular for utilization in vehicle seats, consequently constitutes the inventive component. This component has an essentially flat retainer element that is foamed into the seat cushion, wherein the fastening element has at least one counter-retainer. Consequently, this counter-retainer is not covered by the foam body of the seat cushion and a stitching wire fastened at the cushion cover can thus be connected to the counter-retainer in a load-transmitting manner. It is a characteristic feature that the counter-retainer is implemented in the type of a fastening web, the two ends thereof being connected to the plate-shaped retainer element.

BRIEF DESCRIPTION OF THE DRAWINGS

In the following figures, the inventive solution is exemplarily outlined.

In the drawings:

FIG. 5 shows an example of an alternative embodiment of plastics and metal;

FIG. 6 shows a view onto the flat end of the embodiment of FIG. 5;

FIG. 7 shows another example of an embodiment of plastics and metal; and

FIG. 8 shows another example of an embodiment of plastics and metal.

DETAILED DESCRIPTION OF THE EXAMPLE EMBODIMENTS

Figure 1:
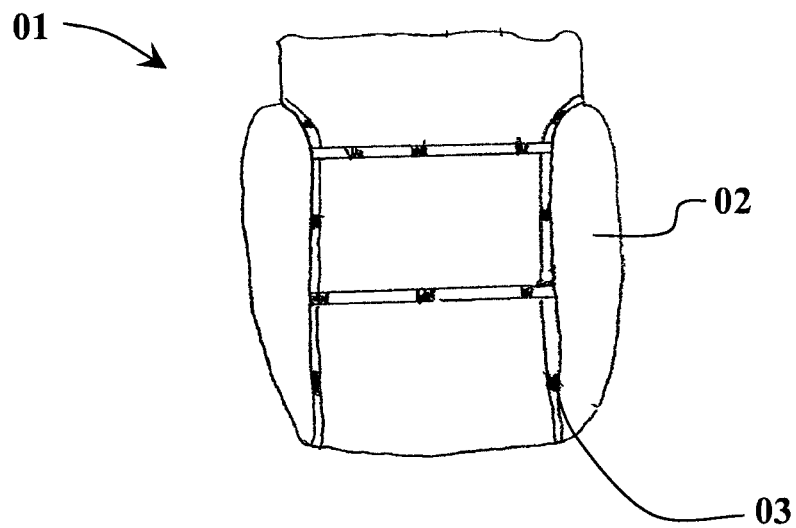
FIG. 1 shows a seat cushion having foamed-in fastening elements.

FIG. 1 exemplarily illustrates a seat cushion 01 that is substantially composed of the foam body 02 and includes several fastening elements 03 foamed into the foam body.

Figure 2:
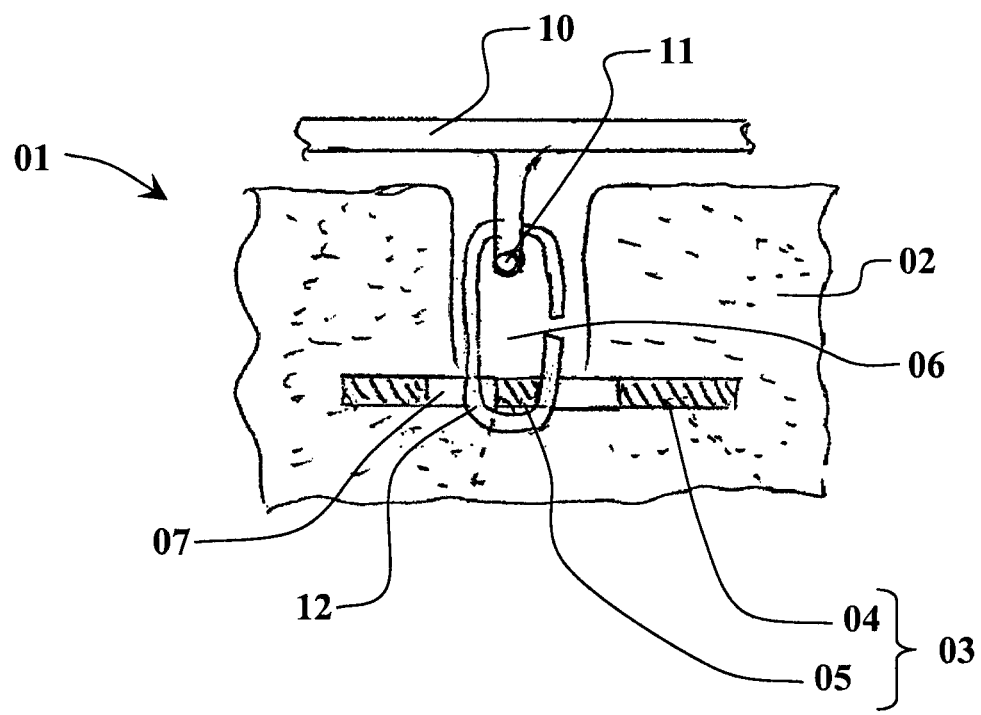
FIG. 2 shows a section through the seat cushion in the region of the fastening element having a cushion cover.

FIG. 2 shows a section through an exemplary solution of a seat cushion having a foamed-in fastening element. The fastening element is composed of the retainer element 04 and the fastening web 05. At least between fastening web 05 and retainer element 04 provision is made for a clearance 07 that is correspondingly required for fastening. The plate-shaped retainer element 04 is substantially completely enclosed by the foam body 02. By contrast, the fastening web 05 is freely accessible from above, so that a corresponding clearance 06 is thus provided in the foam body 02. The cushion cover 10 comprises a stitching wire 11 fixedly connected thereto, by means of which the cushion cover 10 can be fastened at the seat cushion 01. For this purpose, the stitching wire 11 is connected to the fastening web 05 with the aid of a connecting bracket 12.

Figure 3:
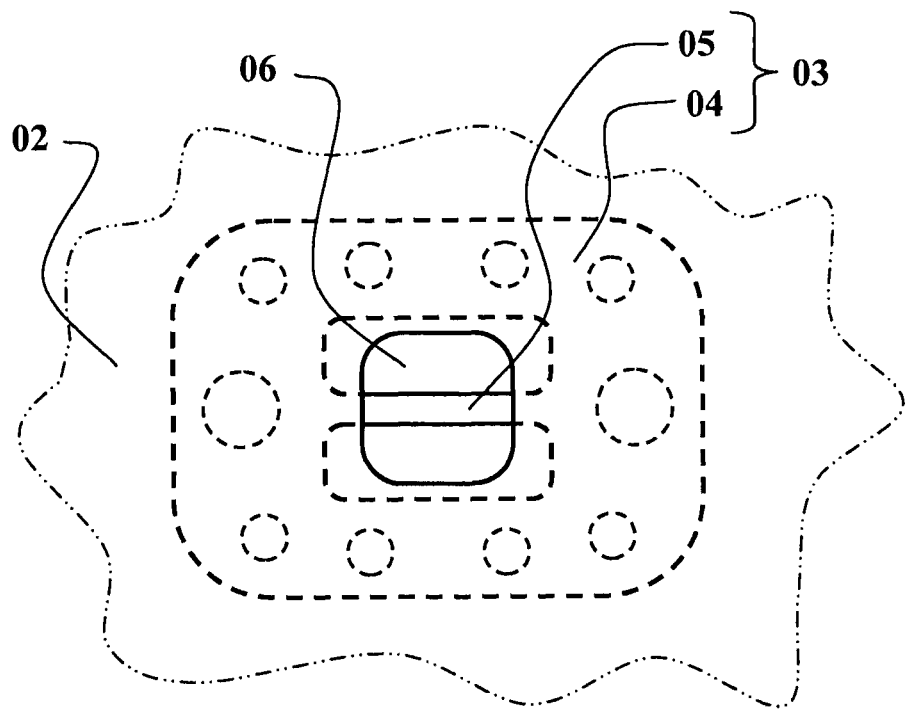
FIG. 3 shows a position of an exemplary fastening element in the seat cushion.

FIG. 3 shows the position of a fastening element 03 in the foam body 02. The fastening element 03 is composed of the substantially completely foamed-in plate-shaped retainer element 04 and the fastening web 05, which is accessible for connection via the clearance 06 in the foam body 02.

Figure 4:
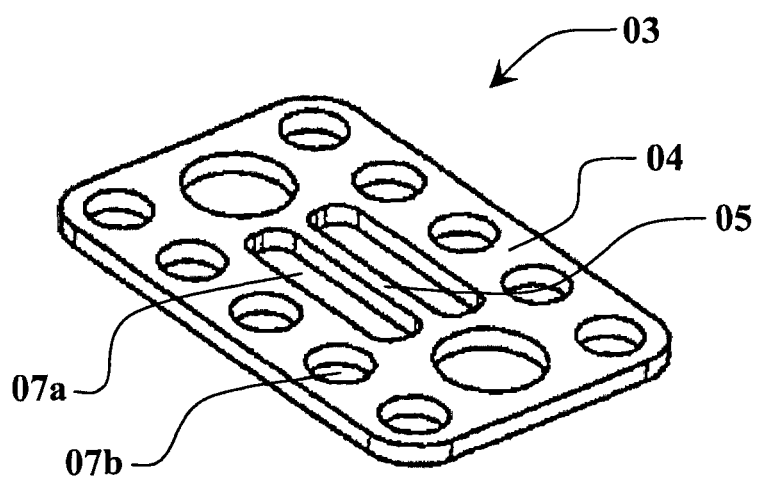
FIG. 4 shows an exemplary, simply configured embodiment of a fastening element.

FIG. 4 shows an example of a simple design of the fastening element 03. In this exemplary embodiment, the plate-shaped retainer element 04 is composed of a flat sheet metal having a fastening web 05 equally disposed in the plane. Between fastening web 05 and retainer element 04 provision is made for the clearances 07a, which are mandatory for fastening. In order to ensure improved foaming into the foam body 02, further clearances 07b are provided in the plate-shaped retainer element 04.

An alternative embodiment of a fastening element 13a for an inventive solution is shown in FIG. 5. Here, a plate-shaped retainer element made of plastics in the form of a plastic plate 14a is provided. This plastic plate may advantageously also feature recesses 07 for improving the connection to the foam body. The fastening web is implemented as a metal web 15 and in this example the plastic plate 16 is already injection-molded on both sides around the metal web as an insert in the injection-molding process. To achieve the same result it is equally possible that the metal web starting from its ends is inserted or else press-fitted into a corresponding longitudinal bore.

FIG. 6 shows a view onto the flat end of the embodiment of FIG. 5. The plastic plate 14a having the centrally arranged metal web 15 is implemented in the form of an essentially flat component. This metal web at its end is embedded into the plastic material 16.

FIG. 7 shows another embodiment of a plastic-metal fastening element 13b. If an assembly process for connecting plastic plate 14b and metal web 15 is supposed to be utilized, the alternating arrangement of straps 17a, 17b serving as fixtures is advantageous. Here, the metal web 15 starting from its frontal end can be inserted and fastened between the straps 17.

If an embodiment precluding confusion in terms of the side of the plate plane is not required to be taken into consideration, a solution according to FIG. 8 can be employed. Here, the metal web 15 with one side thereof is fastened at the plastic plate 14c. This metal web is secured for instance using a simple clip 18 serving as a fixture at the plastic plate. It is obvious that in this case, when in the state embedded in the foam body, the clip must not be positioned on the side facing the seat cover.

The invention claimed is:

1. A seat cushion comprising:
a foam body; and
a plurality of foamed-in fastening elements, wherein each of the fastening elements of the plurality of fastening elements having a plate-shaped retainer element foamed into the foam body of the seat cushion and a single counter-retainer that is not covered by the foam body of the seat cushion, said single counter-retainer being a metallic fastening web having only ends connected to the plate shaped retainer element and a bare metal portion interposed between the ends; and
a stitching wire fastened to a cushion cover and connected to the bare metal portion of the fastening web of the counter-retainer in a load-transmitting manner.

2. The seat cushion according to claim 1, in which the fastening element is integrally made from one sheet metal.

3. The seat cushion according to claim 2, in which the sheet metal has a thickness smaller than 1.5 mm.

4. The seat cushion according to claim 2, in which the sheet metal and the metal web contain a magnetizable metal.

5. The seat cushion according to claim 1, in which the fastening element is integrally made from one injection-molded plastic element.

6. The seat cushion according to claim 1, in which the fastening element is composed of two pieces comprising a metal web serving as the fastening web and a plastic plate serving as the retainer element.

7. The seat cushion according to claim 6, in which the metal web as an insert is enclosed at its ends by the plastic plate being in particular injection-molded around the metal web.

8. The seat cushion according to claim 6, in which the metal web is inserted into fixtures of the plastic plate, wherein the metal web is connected to the plastic plate with the aid of a clamping force.

9. The seat cushion according to claim 6, in which the metal web is composed of one wire section.

10. The seat cushion according to claim 1, in which the fastening element features recesses in a region of the plate-shaped retainer element.

11. The seat cushion according to claim 1, in which in a region of the plate-shaped retainer element and/or in a region of the fastening web, the fastening element features a profile pattern that enhances rigidity.

12. The seat cushion according to claim 11, in which the fastening web has a bent shape and protrudes beyond the plate plane of the plate-shaped retainer element.

13. The seat cushion according to claim 1, in which the fastening web has a straight shape and extends in a plane defined by the plate-shaped retainer element.

14. The seat cushion according to claim 1, in which the fastening web is arranged in a center of the fastening element in a double-symmetrical fashion.

15. A fastening element for foaming into a seat cushion having a foam body, in particular for utilization in vehicle seats, wherein the fastening element comprises:
a plate-shaped retainer element, the retainer element being foamed into the foam body of the seat cushion; and
a single counter-retainer that is not covered by the foam body of the seat cushion, said single counter-retainer being a metallic fastening web having only ends connected to the plate-shaped retainer element and a bare metal portion interposed between the ends; and
a stitching wire fastened to a cushion cover and connected to the bare metal portion of the fastening web of the counter-retainer in a load-transmitting manner.

* * * * *